United States Patent [19]

Galin

[11] Patent Number: 4,573,045
[45] Date of Patent: Feb. 25, 1986

[54] COLLISION DETECTION METHOD USING CRC CODE

[75] Inventor: Robert Galin, Saratoga, Calif.

[73] Assignee: Intel Corporation, Santa Clara, Calif.

[21] Appl. No.: 460,159

[22] Filed: Jan. 24, 1983

[51] Int. Cl.$^4$ .............................................. H04Q 9/00
[52] U.S. Cl. .................................. 340/825.5; 370/85; 371/57
[58] Field of Search ................. 340/825.5; 370/94, 85; 375/7; 371/57, 34, 71

[56] References Cited

U.S. PATENT DOCUMENTS

| | | | |
|---|---|---|---|
| 4,210,780 | 7/1980 | Hopkins et al. | 370/85 |
| 4,271,523 | 6/1981 | Gable | 340/825.5 |
| 4,281,380 | 7/1981 | DeMesa, III et al. | 370/85 |
| 4,292,623 | 9/1981 | Eswaran et al. | 370/85 |
| 4,332,027 | 5/1982 | Malcolm et al. | 370/94 |
| 4,354,252 | 10/1982 | Lamb et al. | 375/7 |
| 4,412,326 | 10/1983 | Limb | 370/85 |
| 4,500,989 | 2/1985 | Dahod | 370/85 |

Primary Examiner—Donald J. Yusko
Attorney, Agent, or Firm—Blakely Sokoloff Taylor & Zafman

[57] ABSTRACT

A method for detecting collisions between digital messages transmitted on a common cable communication system is disclosed. A transmitting station computes a cylic redundancy checking (CRC) code for the transmitted message, and stores the value of the code after N bits have been sent. N bits corresponds to the number of bits transmitted during the "collision window" of the particular system. The transmitting station monitors the receive channel and computes a CRC value for N bits of the received message. If the CRC value calculated for the received message does not match the stored CRC value for the transmitted message, a collision is assumed. If no message is received by the transmitting station after the collision window has elapsed, a collision is also assumed.

15 Claims, 3 Drawing Figures

COLLISION DETECTION METHOD USING CRC CODE

BACKGROUND OF THE INVENTION

1. Field

The present invention relates to data communications systems, and more particularly to methods for detecting the collision of messages transmitted along a multipoint data communication network.

2. Art Background

Multipoint data communications networks permit a plurality of stations, such as for example computers, terminals, printers, analog devices, etc., to communicate over one or more shared communication channels.

In many broad-band local area networks, each station communicates with other stations in the network using well known frequency division multiplexing techniques. Transmissions from all stations are coupled to a common transmit line frequently referred to as the "up-channel", to an electrical retransmission device known as a "head end". The head end retransmits the signals to a common receive line generally referred to as the "down channel". Each station is coupled to the respective common transmit and receive lines by means of a modem. Thus, the transmitter (the modulator) in each modem is coupled to the upchannel and the receiver (the demodulator) is coupled to the down-channel.

In some broad band network systems, the up-channel and the down-channel share a single coaxial cable. The two channels operate at two different carrier frequencies in order to permit the modems of each station to distinguish between transmissions and receptions. In such systems, the head end device translates the transmitted signals to the appropriate frequency for reception.

In other broad band systems, two separate communications lines are utilized, such that the head end device retransmits signals coupled to the up-channels onto the down-channel without the necessity for frequency translation.

Where long cable lengths are used, the delay time for a transmitted signal to travel along the transmit up-channel to the head end and be received by the transmitting station on the receive down-channel can become significant. For example, referring briefly to FIG. 1, assume that station Z begins to transmit a message at time $t_0$. Before Z's signal can pass through the head end and be detected on the receive channel by transceiver Y, assume Y not sensing any cable use, begins to transmit its own message at time $t_1$. A collision of signals results, and thus some collision detection mechanism is needed in the communication system in order to avoid chaos.

The present invention provides a collision detection method which incorporates the use of code schemes commonly used to verify that an error free message has been received. Accordingly, the present invention is easy to implement and is compatible with cable priority access methods such as carrier sensed multiple access (CSMA) (See for example, U.S. Pat. No. 4,234,952).

SUMMARY OF THE INVENTION

A method for detecting collisions between digital messages transmitted on a common cable network communication system is disclosed. A transmitting station initially transmits a flag signal on the transmit-channel of the common cable indicating that a digital message is about to be transmitted. Beginning with the first bit of the digital message, the transmitting station begins to compute a cyclic redundancy checking (CRC) code for the digital message as it is being transmitted. After N message bits have been transmitted, the transmitting station stores the current value of the CRC code. Once the completed data message has been transmitted, the station then transmits a second flag signal indicating that the digital message has been completed. The transmitting station then monitors the receive channel and immediately upon the detection of a flag signal, begins to compute a CRC value for N bits of the message as it is received. If the CRC value calculated for the received signal does not match the stored CRC value of the previously transmitted message, a collision is assumed. In addition, if the transmitting station fails to detect a flag after twice the maximum round trip propagation time (T) for a message on the particular communication system has elapsed (the "collision window"), a collision is also then assumed. In the event of the collision, the transmitting station may then retransmit its message in accordance with some predetermined scheme such as that provided in carrier sense multiple access systems.

DETAILED DESCRIPTION OF THE INVENTION

A method for detecting collisions between digital messages transmitted on a common cable network communication system is disclosed. In the following description for the purposes of explanation, specific numbers, system configurations etc., are set forth in order to provide a thorough understanding of the present invention. However, it will be apparent to one skilled in the art that the present invention may be practiced without these specific details. In other instances, well known circuits and logic operations are shown in block diagram and flow chart form, in order not to obscure the present invention unnecessarily.

Figure 1:
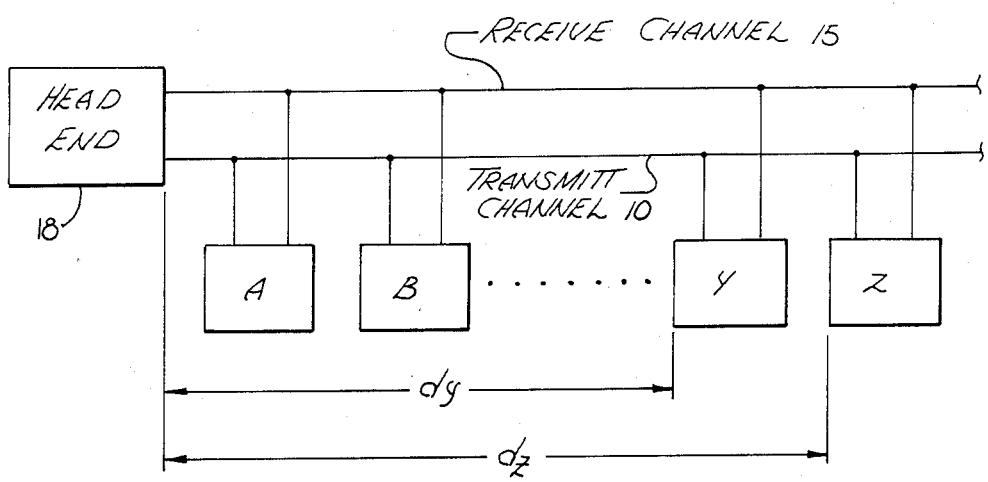
FIG. 1 is a block diagram illustrating a typical broadband communication system wherein a plurality of stations are coupled to common transmit and receive cables.

Referring now to FIG. 1, a typical broad band data communication system is illustrated. A plurality of stations (A,B,. . . Y,Z), are coupled to a transmit channel 10 and to a receive channel 15. The transmit channel 10 is electrically coupled to the receive channel 15 through a head end device 18. Thus, stations A-Z all share a common transmit and receive line. Messages transmitted by a station on the transmit channel 10 are retransmitted by the head end 18, and are coupled to the receive channel 15 to allow reception by a particular station. By appropriate addressing, as is well known, one station may transmit a message to another specific station within the network. It will be appreciated that although FIG. 1 discloses a broad-band network utilizing dual lines, that systems utilizing a single coaxial cable are also commonly constructed and may be equally utilized by the present invention. In such single line systems, head end device 18 performs necessary frequency translation as well as retransmission, as discussed above.

As is shown, station Z is separated from the head end 18 by a distance $D_z$. Similarly, transceiver Y is separated from the head end 18 by a distance $D_y$. Accordingly, there is a time delay associated with a particular station being able to detect its own data transmission, since the signal must propagate to the head end 18 and back to the transmitting station on receive channel 15. In addition, there are finite delays associated with the electronics of both the station (including modem) as well as the head end 18. In FIG. 1, the propagation delay encountered by a station in order to detect its own transmitted signal on the receive channel 15, is comparatively short for stations A and B, and relatively long for stations Y and Z.

Assume for sake of example, that stations Y and Z are in relatively close proximity to one another and therefore have a substantially equal round trip propagation delay T, which in FIG. 1 corresponds to the maximum propagation delay for the network (stations Y and Z are located farthest from head end 18). If at time to station Y begins transmitting a message on transmit channel 10, both stations Y and Z will receive Y's transmission at substantially the same instant after a delay T. However, it will be appreciated that station Z may start transmitting its own message at any time before time T has elapsed, since station Z has not yet detected any activity on the receive channel 15. At worst case, station Y will not be able to detect a collision between messages until an elapsed time of 2T after station Y has begun to transmit its own message. In other words, a transmitting station that has not detected a collision for a period of 2T after it has begun transmitting its own message will not experience a collision thereafter. For purposes of this Specification, this period (2T), which represents twice the maximum round trip propogation delay for a particular network, is defined as the "Collision Window".

The Collision Window is primarily a function of the topology of the system. In this Specification, the Collision Window will be expressed in terms of the equivelent number of "bit-times". If the rate of data transmission by a station is D bits per second, the Collision Window is defined as 2TD bit-times (where the maximum round trip propogation delay T for the network is also expressed in seconds). Thus, in order to ensure unambiguous collision detection, the minimum length of any digital message transmitted on the communication system must be 2TD bits.

Figure 2:
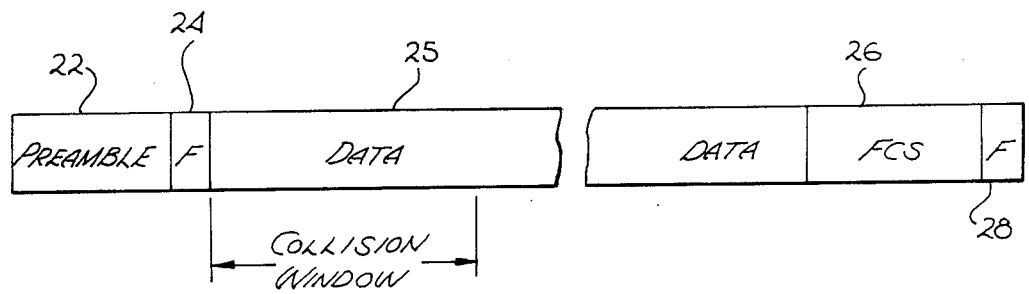
FIG. 2 is an illustration of the format of a typical digital message utilized by the present invention.

Referring now to FIG. 2, most high speed communication networks use self clocking data transmissions. The data is encoded such that a receiver can synchronize itself to the transmitter's clock. All transmissions begin with a repeated bit pattern known as a preamble (22). The preamble is then followed by another distinctive bit pattern, known as a flag (24), to indicate the beginning of the actual data transmission. Commonly, the minimum message length (2TD) is calculated beginning with flag bits 24.

Typically, after the data (25) which comprises the digital message is transmitted by a transmitting station, a frame check sequence (FCS) 26 comprising a cyclic redundancy check (CRC) code, or other error detection code, is transmitted prior to the transmission of an end flag (28) which indicates that the data message has been fully transmitted. A variety of CRC code algorithms have been devised for use in determining whether of not a received signal includes some error in the digital message. The CRC code comprises a unique arrangement of bits which define the frame check sequence 26. The CRC code is calculated for a digital message as it is being transmitted by a station. In general, it is convenient in order to understand cyclic codes to think of the bits comprising the data message to be sent as the coefficients of a polynomial equation. See, for example, R. J. Cypser, Communications Architecture for Distributed Systems, Section 11.6 (Addison, Wesley Publishing Co.). Inasmuch as the particular structure and algorithms used for the calculation of CRC codes as well known in the art, they will not be recited in detail in this Specification.

Figure 3:
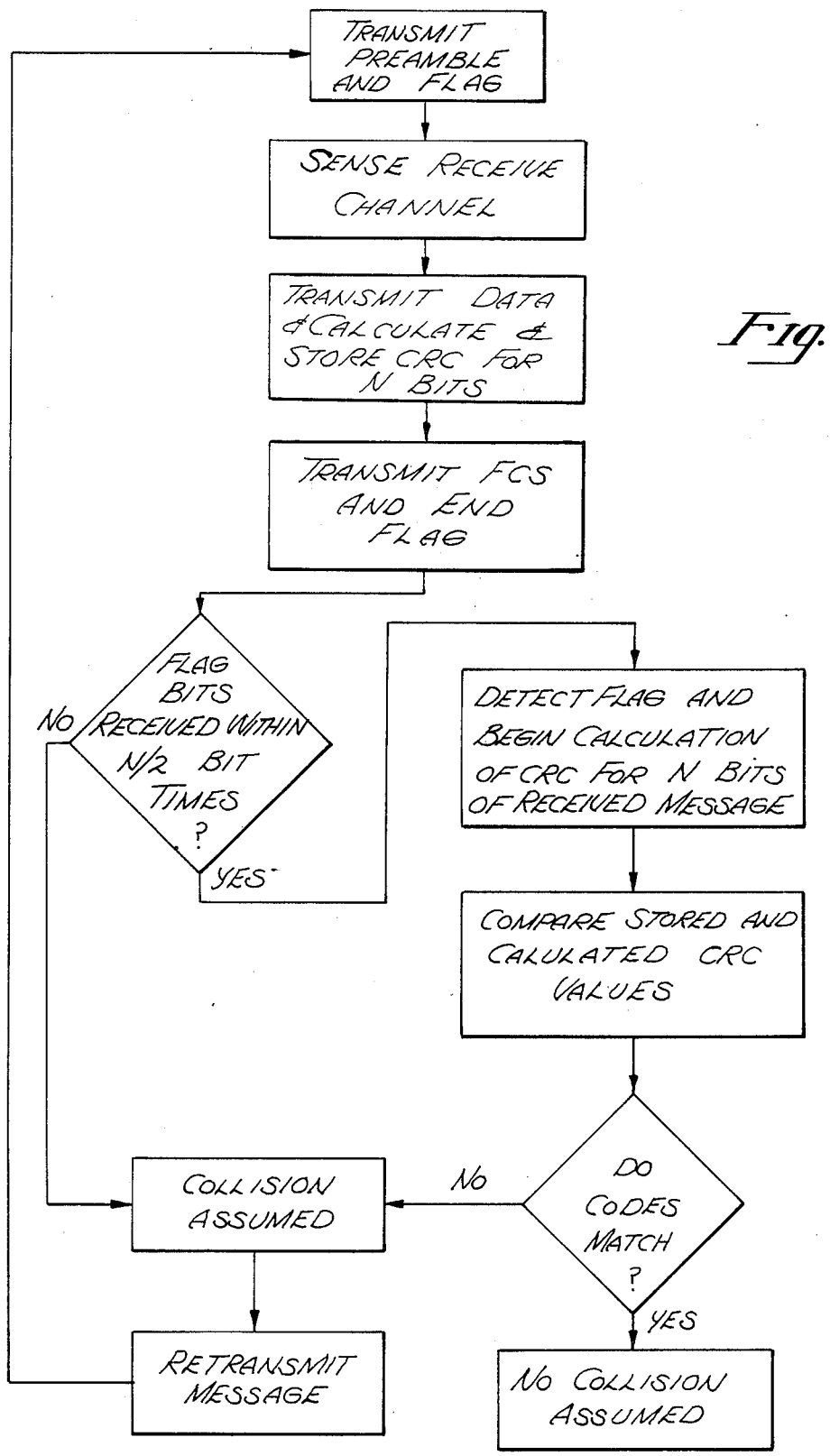
FIG. 3 is a flow diagram of the steps comprising the method of the present invention.

The present invention provides a method for detecting the collision of digital messages transmitted on a common cable network, such as that shown in FIG. 1. Assume for sake of example, that station Z begins transmitting a message on transmit-channel 10 at time $t_0$. As illustrated in the flow diagram in FIG. 3, as well as FIG. 2, station Z transmits preamble 22 and the beginning of message (BOM) flag 24 prior to transmitting the data message 25. Beginning with the first bit comprising data message 25, and for N bits thereafter, station Z while transmitting the data message onto transmit channel 10, calculates the CRC value using predetermined and well known CRC alogorithm means. The value of the CRC for N bits following the last flag bit is stored by the transmitting station Z using well known digital electronics. Station Z then transmits the frame check sequence (which in the presently preferred embodiment comprises the complete CRC code for the entire digital message) and an end of message (EOM) flag bit sequence 28. In practice, the number of bits N corresponds to the collision window (2TD) (where N=2TD), and is determined by the particular topology of the network. Thus, in the presently preferred embodiment all data messages 25 must be a minimum of N bits long in order to insure unambiguous collision detection. The transmitting station simultaneously monitors the receive channel 15 for a BOM flag bit sequence.

If the transmitting station (e.g., station Z) fails, after transmitting its BOM flag 24, to detect a flag on the receive channel 15 during the period of the Collision Window, the station assumes a collision has taken place.

If the transmitting station detects a flag on the receive channel 15, the transceiver begins computing the CRC value for N bits of the received message. If the CRC value for N bits of the transmitted message does not match the CRC value for N bits of the received message, a collision is assumed.

Once a collision is assumed, the station may retransmit its message on the transmit channel 10 in accordance with some predetermined hierarchy, such as for example that of a carrier sense multiple access with collision detection system. It will be noted that, in the event of a transmission error (caused by, for example, a "soft" or other random error), such an error will be detected as an assumed collision by the present invention, inasmuch as the stored and calculated CRC values will not match.

Thus, the present invention provides a method for detecting collisions between messages in a common cable network communication system which is simple to implement using existing error detection CRC shemes. The present invention is highly flexible, since it is not dependent on the data rate or the particular location of any station in the communication system. While the invention has been described with reference to FIGS. 1 through 3 and with emphasis on broad-band communication networks, it should be understood that the Figures are for illustration only and should not be taken as limitations upon the invention.

It is contemplated that many changes and modifications may be made, by one of ordinary skill in the art, to the message structure and method sequence of the present invention without departing from the spirit and scope of the invention.

I claim:

1. In a data communication system having first and second stations coupled to a common line, an improved method utilized by said first station for determining if a message transmitted by said first station has collided with a message transmitted by said second station, comprising the steps of:

calculating the value of a predetermined code for N bits of said transmitted message; said predetermined code containing the same number of bits for all values of N;

storing the value of said code after N bits;

receiving said message on said line and computing said predetermined code for N bits of said received message;

comparing the value of said stored code value with the value of said computed code value for said received message;

whereby a collision is detected if said stored and computed code values do not match.

2. The method as defined by claim 1 wherein a collision is assumed if said first station does not receive said transmitted message after a period 2T, where T is the maximum propagation time delay for a message transmitted on said line to be received.

3. The method as defined by claim 2 wherein said predetermined code is a cyclic redundancy checking (CRC) code.

4. The method as defined by claim 3 wherein said message includes a first flag signal on said line indicating that said message is about to be transmitted, said CRC being calculated beginning with the first bit following the transmission of said flag signal.

5. The method as defined by claim 4 wherein said CRC for said received message is calculated for N bits after receipt of said first flag signal.

6. The method as defined by claim 5 wherein said common line comprises a transmit channel and a receive channel, each of said stations being coupled to said channels such that said stations transmit on said transmit channel and receive on said receive channel.

7. The method as defined by claim 5 wherein the number (N) of said bits to be used to calculate said CRC values corresponds to the number of bits transmitted during time 2T.

8. The method as defined by claim 7 wherein said message includes a second flag signal indicating that said message has been fully transmitted.

9. In a data communications system having first and second stations coupled to transmit and receive channels, said channels being coupled by a head end means, an improved method utilized by said first station for determining if a message transmitted by said first station has collided with a message transmitted by said second station, comprising the steps of:

transmitting a message from said first station to said second station;

calculating the value of a cyclic redundancy checking (CRC) code for N bits of said message where N corresponds to 2DT and where, D = the transmission rate of said first station; and T = the maximum propagation delay time of said system for a message transmitted on said transmit line to be received on said receive channel after passing through said head end means;

storing the value of said CRC code after N bits;

receiving said message on said receive channel and computing a CRC value for N bits of said received message;

comparing the value of said stored CRC with the value of said CRC computed for said received message;

halting transmission of said message if said stored and computed CRC values do not match;

whereby a collision is detected if said stored and computed CRC values do not match.

10. The method as defined by claim 9 wherein a collision is assumed if said first station does not receive said transmitted message after a period 2T has elapsed.

11. The method as defined by claim 10 wherein said first station senses said receive channel for a period of 2T.

12. The method as defined by claim 11 wherein said message includes a first flag signal prior to the transmission of said message, said CRC being calculated beginning with the first bit following the transmission of said flag signal.

13. The method as defined by claim 12 wherein said CRC for said received message is calculated for N bits after receipt of said first flag signal.

14. The method as defined by claim 13 wherein said first station retransmits said message in accordance with a predetermined scheme if a collision is detected.

15. The method as defined by claim 14 wherein said message includes a second flag signal indicating that said message has been fully transmitted.

* * * * *